US008380981B2

(12) United States Patent
Beckwith et al.

(10) Patent No.: US 8,380,981 B2
(45) Date of Patent: Feb. 19, 2013

(54) SYSTEM AND METHOD THAT USES CRYPTOGRAPHIC CERTIFICATES TO DEFINE GROUPS OF ENTITIES

(75) Inventors: Reynolds William Beckwith, Great Falls, VA (US); Jeffrey Grant Marshall, Herndon, VA (US); Jeffrey William Chilton, Reston, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 898 days.

(21) Appl. No.: 12/122,352

(22) Filed: May 16, 2008

(65) Prior Publication Data

US 2009/0287933 A1 Nov. 19, 2009

(51) Int. Cl.
*H04L 29/06* (2006.01)

(52) U.S. Cl. ........ 713/156; 713/150; 713/155; 713/168; 713/176; 726/2; 726/3; 726/4; 726/10; 709/220; 709/223; 709/224; 709/225; 709/226

(58) Field of Classification Search .................. 713/150, 713/155, 156, 168, 176; 726/2, 3, 4, 10; 709/220, 223–226
See application file for complete search history.

(56) References Cited

U.S. PATENT DOCUMENTS

| | | | | |
|---|---|---|---|---|
| 6,748,530 B1 * | 6/2004 | Aoki | | 713/156 |
| 7,010,690 B1 * | 3/2006 | Hanna et al. | | 713/170 |
| 7,068,789 B2 * | 6/2006 | Huitema et al. | | 380/277 |
| 7,669,238 B2 * | 2/2010 | Fee et al. | | 726/22 |
| 7,865,721 B2 * | 1/2011 | Yellepeddy | | 713/158 |
| 2002/0147905 A1 * | 10/2002 | Perlman | | 713/157 |
| 2003/0110374 A1 * | 6/2003 | Yamamoto et al. | | 713/155 |
| 2003/0229452 A1 * | 12/2003 | Lewis et al. | | 702/19 |
| 2004/0039906 A1 * | 2/2004 | Oka et al. | | 713/156 |
| 2004/0088548 A1 * | 5/2004 | Smetters et al. | | 713/175 |
| 2004/0111608 A1 * | 6/2004 | Oom Temudo de Castro et al. | | 713/156 |
| 2005/0081038 A1 * | 4/2005 | Arditti Modiano et al. | | 713/176 |
| 2005/0177715 A1 * | 8/2005 | Somin et al. | | 713/156 |
| 2005/0283608 A1 * | 12/2005 | Halcrow et al. | | 713/175 |
| 2006/0143700 A1 * | 6/2006 | Herrmann | | 726/14 |
| 2006/0155985 A1 * | 7/2006 | Canard et al. | | 713/156 |

(Continued)

OTHER PUBLICATIONS

Youngdae, Kim et al., "Admission control in peer groups", Network Computing and Applications. NCA 2003. Second IEEE International Symposium on Apr. 16-18, 2003, Piscataway, NJ USA, IEEE, Apr. 16, 2003, pp. 131-139.

(Continued)

*Primary Examiner* — Nathan Flynn
*Assistant Examiner* — Sarah Su
(74) *Attorney, Agent, or Firm* — Venable LLP; Robert S. Babayi

(57) ABSTRACT

A system and method for issuing a cryptographic certificate includes describing one or more prerequisite condition on the cryptographic certificate. The one or more prerequisite conditions comprise membership in one or more prerequisite group of entities. An entity may be a participant, a resource or a privilege, etc. The present invention also requires naming one or more target groups of entities on the cryptographic certificate. One or more prerequisite group stakeholder that authorizes an entity in the one or more prerequisite group of entities to be added as members in another group of entities sign the cryptographic certificate. The cryptographic certificate is also signed by one or more target group stakeholders that authorizes an entity to be added as a member of the one or more target groups. Exemplary prerequisite conditions relate to one or more of a membership in another group of entities, a physical characteristic, a temporal characteristic, a location characteristic or a position characteristic, among others.

45 Claims, 7 Drawing Sheets

U.S. PATENT DOCUMENTS

| | | | | |
|---|---|---|---|---|
| 2006/0242407 | A1* | 10/2006 | Kimmel et al. | 713/166 |
| 2008/0250253 | A1* | 10/2008 | Beckwith et al. | 713/189 |
| 2009/0106549 | A1* | 4/2009 | Mohamed | 713/156 |
| 2009/0265551 | A1* | 10/2009 | Tripunitara et al. | 713/168 |
| 2011/0060903 | A1* | 3/2011 | Yoshida et al. | 713/155 |

OTHER PUBLICATIONS

Object Management Group, OMG, (OMG Document: bmi/Feb. 7, 2008) for a Role Based Access Policy (RBAP) Metamodel to define role based access control (RBAC) policies and personnel authorizations that are applied by a RBAC runtime environment.

Thompson et al., "Certificate-based Authorization Policy in a PKI Environment," Lawrence Berkeley National Laboratory, 2001.

Kohl et al., "The Evolution of the Kerberos Authentication Service," pp. 1-15, 1991, revised '94.

Standards for Efficient Cryptography, "SEC 1: Elliptic Curve Cryptography," Certicom Research, Version 1.0, Sep. 20, 2000, pp. 1-90.

Protection Profile (PP), "U.S. Government Protection Profile for Separation Kernels in Environments Requiring High Robustness," Information Assurance Directorate, National Security Agency, Version 1.03, Jun. 29, 2007, pp. 1-181.

* cited by examiner

Minimal Group Name Template

Use Stakeholder 1 Public Key
...
Use Stakeholder N Public Key

FIG. 2

Group Membership Certificate

Entity common name  } Prerequisite Entity Name

Disambiguating identifier
To-The-Group Stakeholder Identifier number 1
...
To-The-Group Stakeholder Identifier number m
From-The-Group Stakeholder Identifier number 1
...
From-The-Group Stakeholder Identifier number n
} Target Group Name Signature of the Target Groups To-The-Role stakeholder number 1
...
Signature of the Target Groups To-The-Role stakeholder number n
} Signatures by every To-The-Group stakeholder for the Target group

FIG. 3

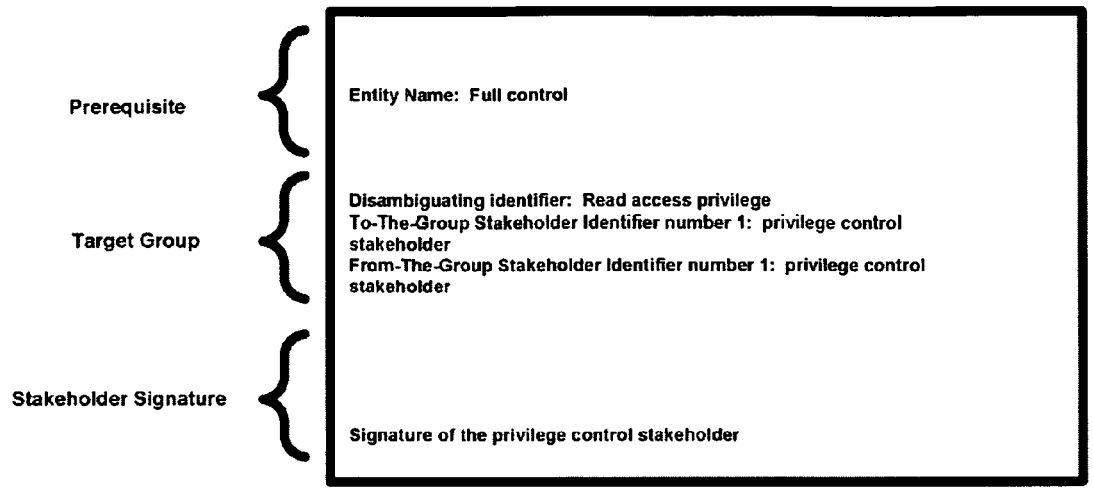
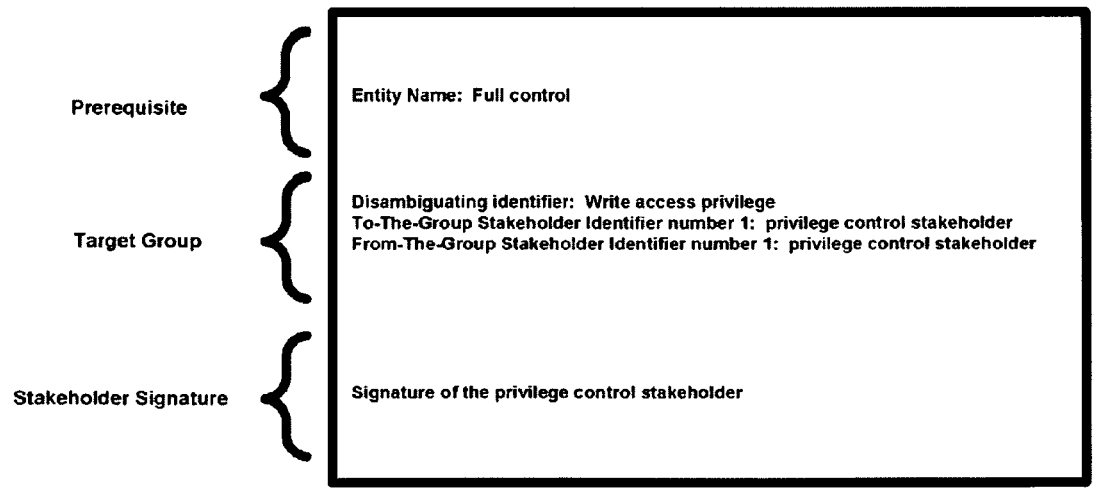
FIG. 8

SYSTEM AND METHOD THAT USES CRYPTOGRAPHIC CERTIFICATES TO DEFINE GROUPS OF ENTITIES

FIELD OF THE INVENTION

The present invention generally relates to the field of information security and more particularly to securing systems cryptographically

BACKGROUND

Cryptography is a discipline of mathematics and computer science concerned with information security and related issues, particularly encryption/decryption of information and authentication of identity. In so called "data-in-movement" applications, cryptography has been applied extensively for securing information flows amongst communicating participants, e.g., client nodes, over communication channels. Cryptography has also been applied for securing information in data storage mediums and databases in what is known as "data-at-rest" applications.

Symmetric cryptography and asymmetric cryptography are known classes of algorithms that use keys having one or more secret parameters for encryption and decryption of information and authentication. In symmetric cryptography, keys represent shared secrets which are known a priori amongst communicating participants. Systems secured with symmetric-key algorithms use relatively simple encryption and decryption computations. Such systems also require choosing, distributing and maintaining the shared secret key amongst the communicating participants. In order to avoid security breach and potential discovery by a cryptographic adversary, the shared secret key must be changed often and kept secure during distribution and in service, making symmetric-key cryptography impractical and hard to scale for securing large systems.

Asymmetric cryptography uses a pair of mathematically related keys known as public and private keys, which obviate the need for prior knowledge of a shared secret key amongst communicating participants. While computationally more intensive, asymmetric key cryptography overcomes scalability disadvantages associated with symmetric key cryptography. Public key infrastructure (PKI) is a known system for securing information using asymmetric key cryptography. In such system, a party at one computer station digitally signs messages using a randomly created private key and a party at another computer station verifies the signature using a distributed public key derived from the private key. The public keys of the communicating participants are distributed in corresponding Identity Certificates, also known as Public Key Certificates, issued by one or more trusted parties called Certificate Authorities (CAs). In this way, PKI keeps messages secret from those that do not possess the private key and the Identity Certificates allows anyone having the associated public key and identity certificate to verify that the message was created with the private key. Consequently, PKI enables communicating parties to be authenticated to each other and to use the public key information in Identity Certificates to encrypt and decrypt messages, thereby establishing message confidentiality, integrity and authentication without advance exchange of shared secret keys.

Each Identity Certificate includes a digital signature that binds a public key with an identity represented by such information as name, e-mail address, etc. By digitally signing the Certificate, a CA attests that the public key belongs to the identity, i.e., the person, organization, server, or other entity noted in the Certificate. The CA is often a trusted third party that issues digital Certificates for use by communicating parties. The requirement of trust obligates the CA to somehow verify the identity credentials of communicating parties. It is assumed that if the parties trust the CA and can verify its signature, they can also verify that a public key does indeed belong to whomever is identified in the Certificate.

Some enterprise-scale PKI systems rely on Certificate chains to establish a party's identity. Under such scheme, a Certificate may be issued by a CA whose legitimacy is established for such purpose by a higher-level CA, and so on. This produces a Certificate hierarchy composed of several CAs, often more than one organization. CAs can manage issuance of Certificates using various computers and assorted interoperating software packages from several sources. This makes standards critical to PKI operation. IETF PKIX working group is involved with standardization of public key Certificate format, including a certificate standard known as X.509.

Various point-to-point secure communication protocols that use cryptography are known. Examples of such protocols include Secure Sockets Layer (SSL), Transport Layer Security (TLS), Secure Shell (SSH), IP Security (IPsec), and High Assurance Internet Protocol Interoperability Specification (HAIPIS). SSL and TLS provide cryptographic endpoint authentication for applications that communicate within client-server based networks for preventing eavesdropping, tampering, and message forgery during communications. SSH is a set of standards and associated network protocols that allow for establishing a secure channel between a local and a remote computer. This protocol uses public-key cryptography to authenticate the remote computer. IPsec is a standard for securing Internet Protocol (IP) communications by encrypting all IP packets for authentication, data confidentiality and message integrity. A HAIPE (High Assurance Internet Protocol Encryptor) is a Type 1 encryption device that complies with the National Security Agency's HAIPEIS. The cryptography used is Suite A and Suite B, also specified by the NSA as part of the Cryptographic Modernization Program. HAIPEIS is based on IPsec with additional restrictions and enhancements. A HAIPE is typically a secure gateway that allows two enclaves to exchange data over an untrusted or lower-classification network. In conventional secure systems, such as those that use the foregoing protocols, encrypted messages are communicated over channels within the network, often through a firewall, based on authentication of identities of the communicating parties by CAs. As long as the identity of the communicating parties are authenticated, conventional secure systems allow the parties to communicate with each other over channels.

Applications often provide access to resources based on credentials supplied by the user. Typically, such applications verify the role of a user and provide access to resources based on that role. Roles are often used in financial or business applications to enforce policy. For example, an application might impose limits on the size of the transaction being processed depending on whether the user making the request is a member of a specified role. Clerks might have authorization to process transactions that are less than a specified threshold, supervisors might have a higher limit, and vice-presidents might have a still higher limit (or no limit at all). Role-based security can also be used when an application requires multiple approvals to complete an action. Such a case might be a purchasing system in which any employee can generate a purchase request, but only a purchasing agent can convert that request into a purchase order that can be sent to a supplier.

One known role based identity management system is provided by Microsoft's .NET Framework. Under .Net Framework, a "principal" represents the identity and role of a user and acts on the user's behalf. .NET Framework applications can make authorization decisions based on the principal's identity or role membership, or both. A role is a named set of principals that have the same privileges with respect to security (such as a bank teller or manager). A principal can be a member of one or more roles. Therefore, applications can use role membership to determine whether a principal is authorized to perform a requested action.

Another role based system is an analytical collaboration platform called Eurekify Sage Enterprise Role Manager (ERM)®, which allows organizations to create and manage role-based privileges models deployed in target platforms. Sage ERM enables organizations to exploit the benefits of Role-Based Access Control (RBAC) to manage their privileges and policies from a business perspective, and to achieve their identification management and compliance goals.

Currently, Object Management Group, OMG, has drafted a request for proposal (OMG Document: bmi/2008-02-07) for a Role Based Access Policy (RBAP) Metamodel to define role based access control (RBAC) policies and personnel authorizations that are applied by a RBAC runtime environment. The Metamodel is intended to be a platform independent model (PIM) that supports the exchange of an RBAP model between modeling tools and runtime systems.

In another conventional approach, Lawrence Berkeley National Laboratory also known as Berkeley Lab has developed a system called Akenti. Akenti addresses the issues raised in allowing restricted access to resources in distributed networks which are controlled by multiple stakeholders. Akenti provides a way to express and enforce an access control policy without requiring a central enforcer and administrative authority. Akenti's architecture is intended to provide scalable security services in distributed network environments. Akenti is designed to allow each stakeholder of a resource to enforce its access control requirements independent of other stakeholders. Akenti allows each stakeholder to change its requirements at any time and to be confident that the new requirements would take effect immediately, and to provide high assurance of integrity and non-repudiability in the expression of the access control requirements.

Akenti makes use of digitally signed Certificates. A Certificate may assert an identity (Identity Certificate), attest to an attribute of a subject (Attribute Certificate), or state a condition to be met (Use-condition Certificate). The Certificates in Akenti are capable of carrying user identity authentication as well as resource usage requirement and user attribute authorizations. A "use-condition" in Akenti relates to a stakeholder's requirement that a potential user must fulfill by producing a corresponding attribute Certificate before being allowed to use a resource. The attribute relates to a characteristic of a person or other identifiable entity. Stakeholders in Akenti can impose a use-condition that a user must belong to a particular group in order to access the resource controlled by such stakeholder. Therefore, a user wanting access to such resource must demonstrate membership in the particular group via a corresponding Attribute Certificate. Attribute Certificate asserts that a user or resource possesses a named attribute for a particular use condition.

In Akenti's system, however, the stakeholders are associated with resources. Such stakeholders control resource access based on use conditions that require the users to meet specified attributes. Under Akenti, resource access is permitted as long as the users meet the attribute requirements specified by the resource stakeholders. One of the drawbacks of Akenti's system is that it does not accommodate the security requirements of stakeholders or authorities that are not resource stakeholders. Such non-resource stakeholders do not have control over users' access privileges to the resources if the resource stakeholders do not prevent the users from accessing the resources. In other words, the resource stakeholders in Akenti may allow resource access to users that may be prohibited from such access by non-resource stakeholders.

Also knows is a computer network authentication protocol called Kerberos, which allows individuals communicating over a non-secure network to prove their identity to one another in a secure manner. A suite of free software published by Massachusetts Institute of Technology (MIT) implements the Kerberos protocol primarily for a client-server model to provide mutual authentication such that both the client and the server verify each other's identity. Kerberos protocol messages are protected against eavesdropping and replay attacks.

Kerberos builds on symmetric key cryptography and requires a trusted third party, termed a key distribution center (KDC), which consists of two logically separate parts: an Authentication Server (AS) and a Ticket Granting Server (TGS). Kerberos works on the basis of "tickets" which serve to prove the identity of users.

The KDC maintains a database of secret keys, each entity on the network, whether a client or a server, shares a secret key known only to itself and to the KDC. Knowledge of this key serves to prove an entity's identity. For communication between two entities, the KDC generates a session key which they can use to secure their interactions. Using the Kerberos protocol, however, the "tickets" must be verified by contacting the KDS, or a central server, thereby introducing a single point of failure for the implemented system. The single point of failure property of the Kerberos systems is not beneficial for systems that have intermittent or failure-prone communications capabilities such as embedded or autonomous systems.

Therefore, as the security needs in information systems become more complicated, there exists a need for a secure system and method that manage access based on advanced and sophisticated security parameters.

BRIEF DESCRIPTION OF THE DRAWINGS

FIG. 2 shows an exemplary group name.

FIG. 3 shows a Group Membership Certificate (GMC) that binds a prerequisite condition associated with an entity to a target group.

FIG. 8 shows exemplary GMCs for grouping privileges.

SUMMARY OF THE INVENTION

Figure 1:
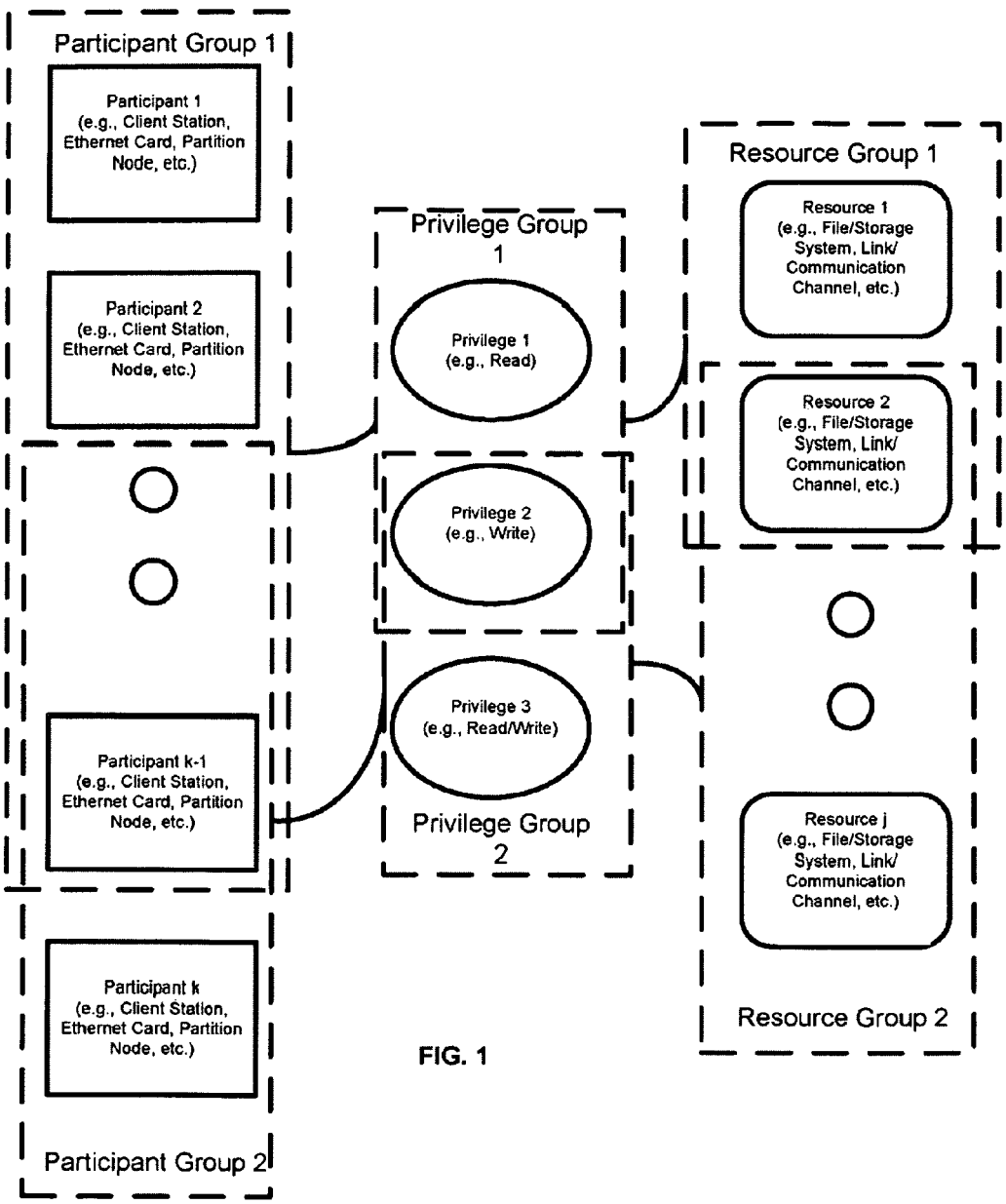
FIG. 1 shows an exemplary conceptual diagram of grouping of client station participants that interact with storage resources according to read, write and read/write privileges.

Briefly, according to one aspect of the invention, system or method for issuing a cryptographic certificate describes one or more prerequisite conditions on the cryptographic certificate. A prerequisite condition comprises membership in one or more prerequisite groups of entities. One or more prerequisite group stakeholders (or authorities) whose approval is necessary to use membership in the prerequisite group for making a decision sign the cryptographic certificate. Exemplary decisions made based on such approval could relate to admitting membership in a group, granting access to a resource, or performing an action. In one embodiment, the identity or name of the prerequisite group is associated with the identity of a prerequisite group stakeholder. For example, the public key of the stakeholder can be part of the identity of the prerequisite group. In another embodiment, the certificate grants a privilege to access a resource. The certificate can be signed by one or more stakeholders or authorities who control access to the privilege or resource.

Moreover, a method for processing a cryptographic certificate receives the cryptographic certificate, which describes at least one prerequisite condition comprising membership in at least one prerequisite group of entities, and determines whether the cryptographic certificate is validly signed by at least one prerequisite group stakeholder whose approval is necessary to use membership in the prerequisite group in making a decision.

According to another aspect of the present invention, a system and method for issuing a cryptographic certificate comprises describing one or more prerequisite condition on the cryptographic certificate. The one or more prerequisite conditions comprise membership in one or more prerequisite group of entities. An entity may be a participant, a resource or a privilege, etc. The present invention also requires naming one or more target groups of entities on the cryptographic certificate. One or more prerequisite group stakeholders or authorities sign the cryptographic certificate authorizing an entity in the one or more prerequisite groups to be added as members in another group of entities. The cryptographic certificate is also signed by one or more target group stakeholders or authorities that authorize an entity to be added as a member of the one or more target groups. Exemplary prerequisite conditions relate to one or more of a membership in another group of entities, a physical characteristic, a temporal characteristic, a location characteristic or a position characteristic, among others.

According to some of the more detailed features of the present invention, the names of the one or more prerequisite groups comprise the names of the one or more prerequisite group stakeholders that authorize membership of a prerequisite group member in another group and the names of one or more prerequisite group stakeholders that authorize membership in the one or more prerequisite groups. The names of the one or more prerequisite groups can further comprise one or more prerequisite group disambiguating identifiers. In one exemplary embodiment, the names of the one or more prerequisite group stakeholders comprise the public key of the one or more prerequisite group stakeholders. The signatures of the one or more prerequisite group stakeholders comprise the cryptographic signatures of the certificate made using such stakeholders' private keys.

Similarly, the names of the one or more target groups comprise the name of the one or more target group stakeholders that authorize membership or addition of a target group entity in another group and the names of one or more target group stakeholders that authorize an entity to become a member of the one or more target groups. The names of the one or more target group stakeholders comprise the public keys of the one or more target group stakeholders and the signature of the one or more target group stakeholders comprise cryptographic signatures of the certificate made using the one or more target group stakeholders' private keys.

According to still another aspect of the invention, a cryptographic certificate comprises the names of one or more of prerequisite groups, the names of one or more target groups, one or more cryptographic signatures of prerequisite group stakeholders that authorize an entity in a prerequisite group to be an entity in another group, and one or more crypto graphic signatures of target group stakeholders that authorize adding an entity name to the target group.

According to yet another aspect of the invention, a system that processes cryptographic certificates comprises a plurality of entities. The system also comprises one or more group membership certificates. Each group membership certificate comprising names of one or more prerequisite groups, names one or more target groups and names of one or more stakeholders functioning as one or more prerequisite group stakeholders and target group stakeholders. A group membership certificate is valid if signed cryptographically by one or more prerequisite group stakeholders that authorize an entity in a prerequisite group to become an entity in another group. The group membership certificate is further signed cryptographically by one or more target group stakeholders that authorize adding an entity to the one or more target groups. A node receives a cryptographic certificate from an entity. The node examines a valid group membership certificate and adds the entity to the target group named in the valid group membership certificate provided that the received cryptographic certificate validly binds the entity to a prerequisite group named in the valid group membership certificate.

DETAILED DESCRIPTION OF THE INVENTION

The present invention relates to a system or method that applies cryptographic certificates for defining groups of entities. The entities being grouped may vary in nature, as they are not required to have any properties beyond the ability to be named or otherwise identified in a cryptographic certificate. Exemplary entities include both physical and logical entities, such as human beings, processing units, nodes, client stations, file systems, computer hardware, executing instances of computer programs, read or write access privileges, operating system privileges, storage resources, computational resources, and/or communications resources, or other groups.

FIG. 1 shows an exemplary conceptual diagram of grouping of client station participants that interact with storage resources according to one or more privileges. A participant comprises any entity that is capable of keeping a secret, and proving knowledge of that secret to other participants without divulging that secret, for example, using a mutual authentication protocol such as the Elliptic Curve MQV (ECMQV) protocol, as standardized in ANSI X9.63, IEEE 1363-2000 and ISO/IEC 15946-3. In one embodiment, participants may be realized in hardware or software and can be identified or named using cryptographic public keys. A web client, SQL client, file server, Ethernet card, partition, application, node, system, computer or device, may be a participant, among others.

In one exemplary embodiment, participants are entities capable of directly interacting with resources and indirectly, via resources, with other participants. A resource comprises a non-participant entity, including but not limited to any hardware, firmware, data, and/or software is executed, used, utilized, created or protected. A resource is not a participant. Exemplary resources that can be cryptographically grouped together according to the present invention include files stored in a file system, ports in a network stack, random access memory in a computer, etc. Other exemplary resources include any usable processing power, link, communication channel, I/O bus, memory bus, hardware or software as well as socket library, protocol stack, device driver, etc. Resources can also comprise encryption/decryption units implementing any suitable asymmetric and/or symmetric key cryptography algorithms and methods according to the present invention.

In one exemplary embodiment of the invention, resources are entities that may be acted upon or consumed by those participants that have the necessary privileges. A privilege comprises an allowable interaction between one or more participants and one or more resources. Privileges associated with a file resource, for example, may include the privilege to read from or write to that file resource or both. Another example is the privilege to use a Random Access Memory (RAM) to run a program. As stated above, in an exemplary embodiment, participants are named or otherwise identified by cryptographic public keys since they are capable of keeping a secret, and proving knowledge of that secret to other participants without divulging that secret. Resources and privileges, however, are named, referred to or otherwise identified using a description of the resource or privilege with sufficient detail for identifying the resource or privilege.

In general, the present invention relates to a system or method for the use and creation of one or more certificates as a means to determine whether one or more named entities, e.g., a participant, resource, or privilege is/are a member of a group. The certificates of the present invention may be verified without contacting a central server. Optionally, a system or method implementing the present invention may include further certificates allowing for additional identifiable information to be associated with or bind to either entities or groups. Accordingly, in the present invention, one or more certificates known as group membership certificates (GMCs) define whether one or more entities is/are member(s) of one or more target groups. Individual entities as well as one or more groups of entities can be named in the GMCs for membership in a target group. A GMC describes one or more group membership pre-requisite conditions (GMPC) as well as the name of the target group name. An exemplary GMPC may require proof of meeting a condition verifiable by the party relying on the GMC at the time the GMPC is being evaluated for satisfiability, including: membership in another named group, proof of being the entity having a particular name, proof of having a physical (e.g., mechanical, optical, thermal, geometrical, etc.), non-physical, temporal or non-temporal characteristics, including characteristics relating to status, height, width, geometry, time, place, position, location, amplitude, phase, frequency, current, voltage, resistance, etc. Exemplary proofs include proof of current location matching a specified location, proof of matching a biometric characteristic, proof of current date and time matching a specified date or time, etc.

For example, a plurality of entities can be part of a named prerequisite group that itself can become a member of the target group if the necessary prerequisite conditions for membership is/are met. In this way, each GMC sets forth prerequisite membership conditions for the named target group. Satisfaction of the one or more prerequisite conditions according to a defined satisfaction criteria grants the entities membership in the target group. In various embodiments of the present invention, the prerequisite satisfaction criteria for membership in the target group can relate to any one of the satisfaction of every prerequisite; the satisfaction of one of the prerequisites; the satisfaction of some combination of prerequisites as described by an equation in Boolean algebra whose operators comprise conjunction (and) and disjunction (or); the satisfaction of some number m of the n total prerequisites.

As stated above, the satisfaction of group membership prerequisite conditions is necessary to grant an entity membership in the target group. As further described below, stakeholders having the necessary authority sign the GMCs to bind the one or more GMPCs to a target group, thereby allowing one or more entities that meet the one or more prerequisite conditions to become members of the named target group.

In this way, the present invention extends existing certificate-based methods for grouping entities by requiring the names of groups to contain additional information. In one exemplary embodiment, groups names comprise, directly or indirectly, the public keys of the authorities whose approval is necessary to use membership in that group as a factor in a decision. This means that two groups have the same names only when the set of decision-use authorities are equal. Group names may include other information, and have additional constraints on equality in systems implementing the present invention, so long as the information and constraints of the present invention are included and applied. Thus, each GMC binds one or more prerequisite condition(s) to a target group name. A template for an exemplary group name is presented in FIG. 2.

Figure 4:
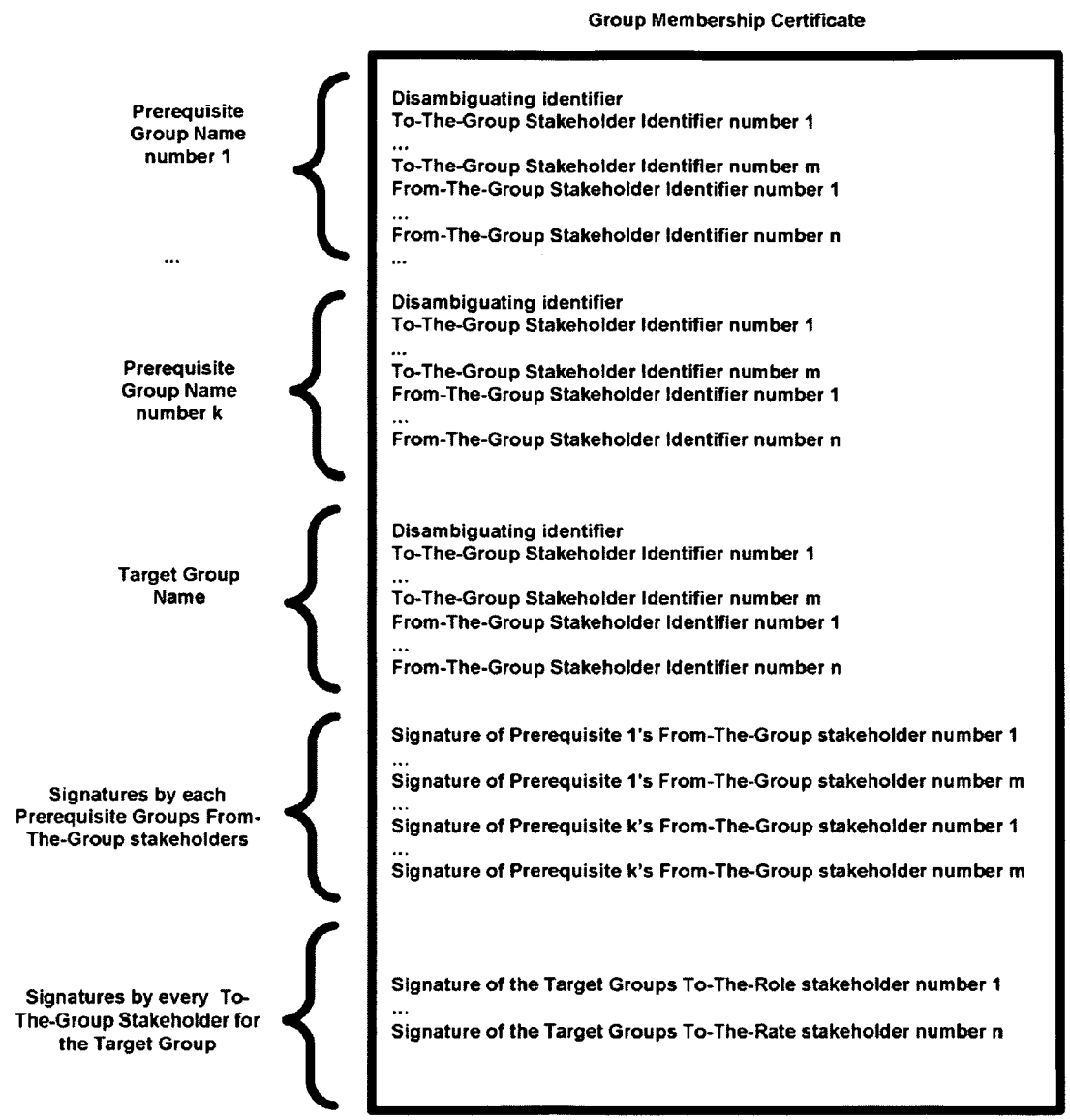
FIG. 4 shows a GMC that binds one or more prerequisite conditions associated with groups to a target group.

In one exemplary embodiment of the invention, two types of GMCs are implemented. FIG. 3 shows a GMC that binds a prerequisite condition associated with an entity to a target group, and FIG. 4 shows a GMC that binds one or more prerequisite conditions for membership in other groups to a target group. According to the exemplary GMC of FIG. 3, the group membership prerequisite condition comprises the proof of an entity having a particular name, for example, John Doe, belonging to a target group where the binding of the entity with the target group is manifested by the signature(s) of the appropriate stakeholder(s) on the GMC. According to the GMC of FIG. 4, the group membership prerequisite conditions comprise proof of membership in another named prerequisite group, once again, where the binding of the name prerequisite group with the target group is manifested by the signature(s) of the appropriate stakeholder(s) on the GMC.

Thus, the validity of a GMC is determined by the presence of valid cryptographic signatures on that GMC by the necessary stakeholders, which bind the group membership prerequisite condition(s) to membership in one or more target groups. Stakeholders are identified in the names of the one or more target groups and the names of groups or individuals named in the GMPCs. According to one embodiment of the invention, one category of stakeholders called "to-the-group" stakeholders grant permission for admission to the target group. The signatures of the to-the-group stakeholders are necessary on a certificate to expand the set of entities that belong to the target group. Another category of stakeholders called "from-the-group" stakeholders are identified in the group names. Such group names comprise, directly or indirectly, the public keys of the authorities whose approval is necessary to use membership in that group as a factor in a decision. For example, from-the-group stakeholders grant permission for entities in one group to become member of another group, or to bind additional information, such as a privilege, to proof of membership in that group. The signatures of the from-the-group stakeholders are necessary on a GMC to authorize the use of proof of membership in one group as a prerequisite for membership in the target group. The from-the-group signatures are also necessary on other certificates which bind information to that group, such as a certificate granting a privilege that requires membership in the group as a prerequisite.

The name of a group as it appears on a GMC, whether a prerequisite group or a target group, consists of several parts. First, the group name comprises sufficient information to determine the cryptographic public key of each of the to-the-group stakeholder. Second, the group name comprises information sufficient to determine the cryptographic public key of each from-the-group stakeholder. One exemplary form for the information describing a set of stakeholders is an explicit list of the stakeholders public keys. Alternatively, a set of identifiers that resolve to unique identity certificates binding those identifiers to public keys may be used. Optionally, the name of a group includes one or more disambiguating identifiers that serve to distinguish the group from other groups having the same set of to-the-group and from-the-group stakeholders. Exemplary disambiguating identifiers comprise a textual common name, a digital image; a digital sound, a cryptographic hash of any of the previously listed identifiers, or any combination of the previously listed identifiers.

The GMC shown in FIG. 3 comprises a single GMPC requiring that an entity prove that it has a given name. Further, the GMC contains the name of the single target group to which the certificate grants membership. The target group name comprises a disambiguating identifier and an arbitrary number of to-the-group stakeholders identifiers denoted by the variable m, and from-the-group stakeholders identifiers denoted by the variable n. In order to be valid for binding the prerequisite entity name to the target group name, the GMC of FIG. 3 also contains the signatures of the to-the-group stakeholders, 1-n, for the target group. As stated above, the to-the-group stakeholders, 1-n, of target group of FIG. 3 allow the membership in the target group to be expanded to include the prerequisite entity name specified in the GMC of FIG. 3. Since the GMC of FIG. 3 does not require proof of membership in a group as a prerequisite for membership in another group, the signatures of from-the-group stakeholders are not required for the validity of the GMC.

The GMC shown in FIG. 4 contains an arbitrary number of GMPCs, comprising any number of prerequisite group names denoted by the variable k, each requiring an entity to demonstrate membership in a corresponding prerequisite group in order to gain membership in the target group. This GMC is designed to demonstrate the signature requirements for GMC validity when group membership is used as a prerequisite condition for the GMC. The name of each group for which membership is listed as a prerequisite condition in the GMC of FIG. 4 has arbitrary numbers of to-the-group stakeholders, denoted by the variable m, and from-the-group stakeholders, denoted by the variable n. These variables are scoped within the name of a prerequisite group; different values for m and n can be used for each prerequisite group name in the GMC. In order to be valid for binding the prerequisite names to the target group name, the GMC of FIG. 4 contains the signatures of two types of stakeholders. The GMC of FIG. 4 contains the signatures of from-the-group stakeholders of the groups for which membership is listed as a prerequisite condition. Also necessary on the GMC of FIG. 4, is/are the signatures of the to-the-group stakeholders, 1-n, of target group of FIG. 4, which allow the membership in the target group to be expanded to include an entity that can prove membership in the prerequisite groups specified in the GMC of FIG. 4.

A system implementing the present invention learns about membership in the groups by examining each GMC, which essentially comprises tatements about group membership. The system initially considers a group to be empty. Such a system then learns the conditions sufficient for entities to become group members by examining the GMCs. In one embodiment of the present invention, when multiple GMCs containing different GMPCs having the same target group are known to the system, satisfaction of the prerequisites from either certificate is sufficient for an entity to attain membership in a target group. Thus, a system that does not have access to every issued GMC errors on the side of excluding an entity from group membership, and the introduction or addition of further GMCs into that system can increase, but not decrease the number of entities having membership in a given group. In this way, the GMCs may be verified without contacting a central server. Thus, unlike Kerberos system, the present invention does not introduce a single point of failure.

Two group names refer to the same group if the set of to-the-group stakeholders and from-the-group stakeholders in the first group name are the same as the to-the-group stakeholders and from-the-group stakeholders in the second group name and the disambiguating identifier(s) in the first group name is the same as the disambiguating identifier(s) in the second group name.

The present invention can apply the GMCs in several contexts. One exemplary application of the present invention is found in the creation, evaluation and enforcement of security policies (SPs), which describe the permitted relationships between participants, resources and/or privileges. The relationships between participants resources and/or privileges are authorized by corresponding stakeholders and enforced by one or more guards that mediate access of participants to resources according to privileges, if any.

Figure 5:
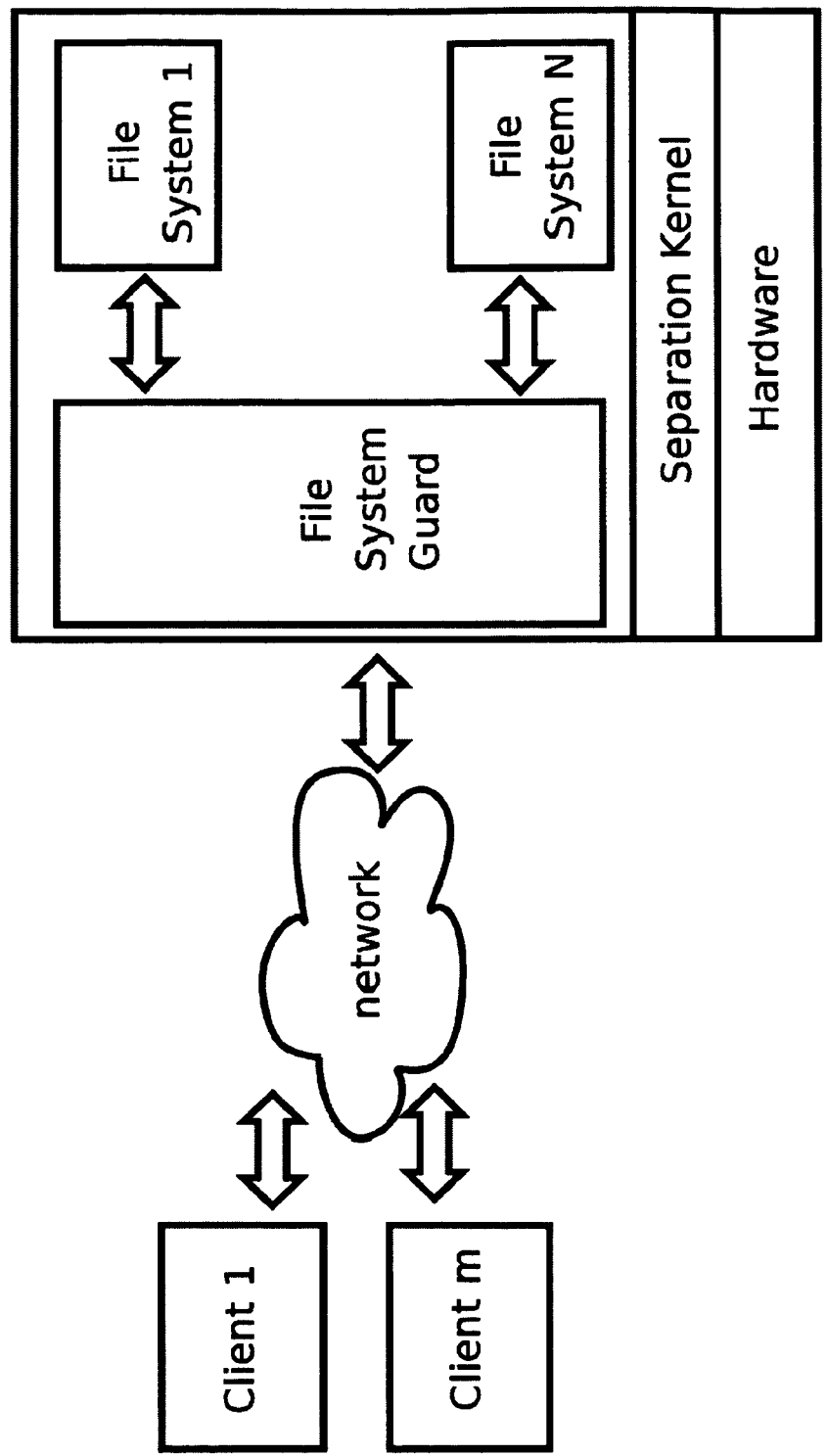
FIG. 5 is a block diagram of a system that implements an exemplary embodiment of the present invention.

FIG. 5 depicts an exemplary system implementing the enforcement of a mandatory access control SP using the present invention. This system is implemented using one or more nodes. A node usually includes a processing unit (not shown), such as one or more CPUs, microprocessors, embedded controllers, digital signal processors, etc, for executing codes, programs, and/or applications. Each node can be any one or combination of a wired or wireless node, a client, a server, a router, a hub, an access point, or any other known device which communicates with other devices using a resources.

In one exemplary embodiment, the node of FIG. 5 contains partitions running on hardware under the control of a Separation Kernel, and an arbitrary number of clients connected to the node via a wired or wireless network. According to an exemplary embodiment of the present invention, the node runs under the control of the SK. One exemplary class of SK that may be used in the present invention is described in a Protection Profile (PP) published by the National Security Agency (NSA) entitled "U.S. Government Protection Profile for Separation Kernels in Environment Requiring High Robustness" (SKPP), which is hereby incorporated by reference in its entirety. It should be noted however that the present invention can be used in any system or network, that uses any type of computing model, such as client-server mode, real-time and non-real time distributed networks, central networks, peer-to-peer networks, embedded systems, etc, with or without an SK.

According to an exemplary embodiment of the present invention, at least one node as shown in FIG. 5 runs under the control a corresponding SK. Each SK provides to its hosted software programs high-assurance partitioning and information flow control properties that are both tamperproof and non-bypassable. The SK comprises hardware and/or software mechanism whose primary function is to create multiple partitions for a node. A partition is an abstraction implemented by the SK from resources under its control according to a configuration data that implements all or portions of one or more SPs. As described further in detail, the present invention uses SPs that are signed by stakeholders for implementing security parameters of the system. Each SK partition comprises at least one subject and/or resource. A subject is any entity within the scope of control of the node that performs a function, for example, an inter-node communication function. Resources may be used by subjects individually or simultaneously to allows the subjects access to information within the resources. A participant in the system of the present invention can be realized in a node or partition or subject defined by one or more SKs on the same node or on different nodes, which are coupled to each other via one or more communication channels.

A node operating under the control of a SK protects the subjects and resources running in partitions on the node from information flows that violate the SP. The SK separates resources into policy-based equivalence classes and controls information flows between subjects and resources assigned to the partitions according to the SK's configuration data. In one embodiment, a node comprises any hardware resource running a single SK, where the SK controls information flow between and/or within the multiple partitions of the node according to the SK's configuration data. In particular, each node runs its own SK which protects resources unique to that node. Preferably, the SK configuration data specification is unambiguous and allows a human examiner (possibly with tool support) to determine whether any given potential connection would be allowed by the policy, and every resource allocation rule specified by the policy.

The present invention uses various tools for creating or obtaining public and private keys and digitally signed approvals needed to implement desired SPs. Each node has an associated node identity (NI), which comprises a pair of public-key and private-key. Each partition on the nodes also has a corresponding partition Identity (PI). A PI for each partition comprises a pair of values consisting of the public-key of the Ni of the node on which the partition is created and a unique index which refers to the partition on the node.

In the system of FIG. 5, a guard is implemented in a partition trusted to protect the resources of a file system in partitions. The guard must ensure that no client, which act as participant, gains access to a file system partition unless that access is consistent with the SP. The file system partitions are accessible only by those clients that comply with the SP. In one embodiment, the file system partitions attempt to satisfy every request presented to them, and do not take part in enforcing the SP. Instead, any policy protecting the data of one client from another client is implemented by the guard. A network connects clients to the guard partition, which acts as a reference monitor for the file system partitions. Clients can run either separation kernel operating systems, or conventional operating systems such as Microsoft Windows or Linux. In another embodiment, a resource stakeholder authorization may also be required for assessing the file system.

Guards may be realized in hardware or software. Exemplary guards include a partitioning Communications System (PCS), and a Virtual Private Network (VPN) implementation. PCS is disclosed in the U.S. patent application Ser. No. 11/125,099 filed on May 10, 2005 and assigned to the assignee of the present invention, which is hereby incorporated by reference in its entirety. PCS supports multi-level secure (MLS) systems that enables secure, distributed communications upon which many higher-level technologies may be layered. As such, PCS can be used as a building block for implementing trustworthy distributed systems. PCS is a communication controller within a node that communicates data with another node or client over one or more channels. PCS supports data-flow policies among partitions that are managed by SKs. PCS deploys a combination of hardware and/or software, which provides communications amongst nodes/clients that may or may not run under the control of corresponding SKs. In this way, PCS enables creating multi-domain networks whose security is not dependent on physical hardware separation and protection or on any particular network hardware.

Under the present invention, the guards shown in FIG. 5 can protect or control a wide variety of resources, including an Ethernet switch, network router, operating system kernel, display monitor, keyboard, mouse, projector, cable set top box, desktop computer, laptop computer, server computer, satellite, sensor, shooter, unmanned vehicle, avionics device, personal video and/or audio device, telephone, cell phone, telephone switch, television broadcasting equipment, television, database server, cross domain guard, separation kernel, file server, video and/or audio server, smart cards, or PDA.

The GMCs are used in the present invention to group any type of entities that are subject to the SP. For example, the GMCs may be used to create groups of participants, which can then be associated with a privileges. Unlike the traditional role-based access control systems, which associate each individual participant with a desired privilege, grouping according to the present invention allows for more concise and maintainable statements of SP. Applying the GMCs of the present invention provides more expressive power than traditional RBAC due to the presence of the separate to-the-group and from-the-group stakeholder sets that describe the group names. This separation of stakeholders is desirable whenever the set of stakeholders trusted to admit an entity into a group is not the same set of stakeholders trusted to assign privileges to that group or use membership in that group to gain access to another group. For example, a quality control inspector may be trusted to admit a radio into a group that represents standards-compliant radios, but a separate stakeholder (such as the FCC), may be responsible for admitting the radio into groups that enable the radio to transmit on a specific frequency.

In another embodiment, the GMCs could be used to implement SPs by creating groups of resources. Instead of granting a privilege naming a specific resource, this embodiment of the invention grants a privilege over every resource in a group of resources as defined by applicable GMCs. For example, when the resources are computer files, those files could be made members of a group defined by a corresponding GMC. The set of files defined by this group could grow when new GMCs are issued. In still another embodiment of the invention, privileges can be grouped, and participants can be granted every privilege in a group of privileges over a given resource. Further, any combination of GMCs can be combined into a single system, allowing participants, resources and/or privileges to be grouped as necessary.

Accordingly, the GMCs of the present invention can be used to enforce a desired SP. The GMCs can be presented by clients to the guard over the network after proving to that guard that they satisfy some prerequisite conditions, such as having a particular name. This proof could be accomplished by a run of a cryptographic authentication and key establishment protocol such as ECMQV, in combination with the presentation of an X.509 identity certificate. A stakeholder wishing to implement the Bell-LaPadula model for multi-level security with the GMCs may treat clients as participants and group them according to the security clearance level of the person who uses that client. Further, file system partitions may be treated as resources and grouped according to their classification level. Factors beyond the security clearance level of the person using the client may also contribute to the determination that a client should be privileged to access a given file system partition. The present invention allows these components of the decision to be expressed individually, and the determination of satisfaction of each component delegated to different parties without losing control of the resulting authorization decision.

As an example, the stakeholder controlling access to secret-level sensitive file system partitions may decide that the following conditions are necessary for read access to those partitions: the people using the clients hold security clearances of the secret level or higher; the clients are located inside a secure facility; the clients are running secure operating systems. Further, this secret-level stakeholder knows individuals or organizations capable of determining each of these facts for any given client, and wishes to delegate the verification for each condition individually to the cognizant individuals or organizations. However, this stakeholder does not wish to delegate the ability to use those decisions in other contexts to those individuals or organizations performing the different verifications.

Using the present invention, the secret-level stakeholder names four groups. The first named group describes secret-cleared client computers, and includes the secret-level stakeholder as the only to-the-group and the only from-the-group stakeholder for that group. This ensures that the secret-level stakeholder is the only entity capable of issuing GMCs that provide privileges to that group, and that the secret-level stakeholder is the only authority capable of issuing GMCs that admit clients into that group.

Next, the secret-level stakeholder names one additional group for each prerequisite condition that must be satisfied for access to secret-sensitive file systems. The names for these additional groups lists the organization trusted to verify the condition as the to-the-group stakeholder and the secret-level stakeholder as the from-the-group stakeholder. This ensures that the delegated stakeholders are the only entities capable of admitting clients into the group representing condition verification, and that the secret-level stakeholder is the only stakeholder capable of issuing certificates using those condition verification groups as prerequisites. These groups represent prerequisite conditions for membership in the target group.

Figure 6:
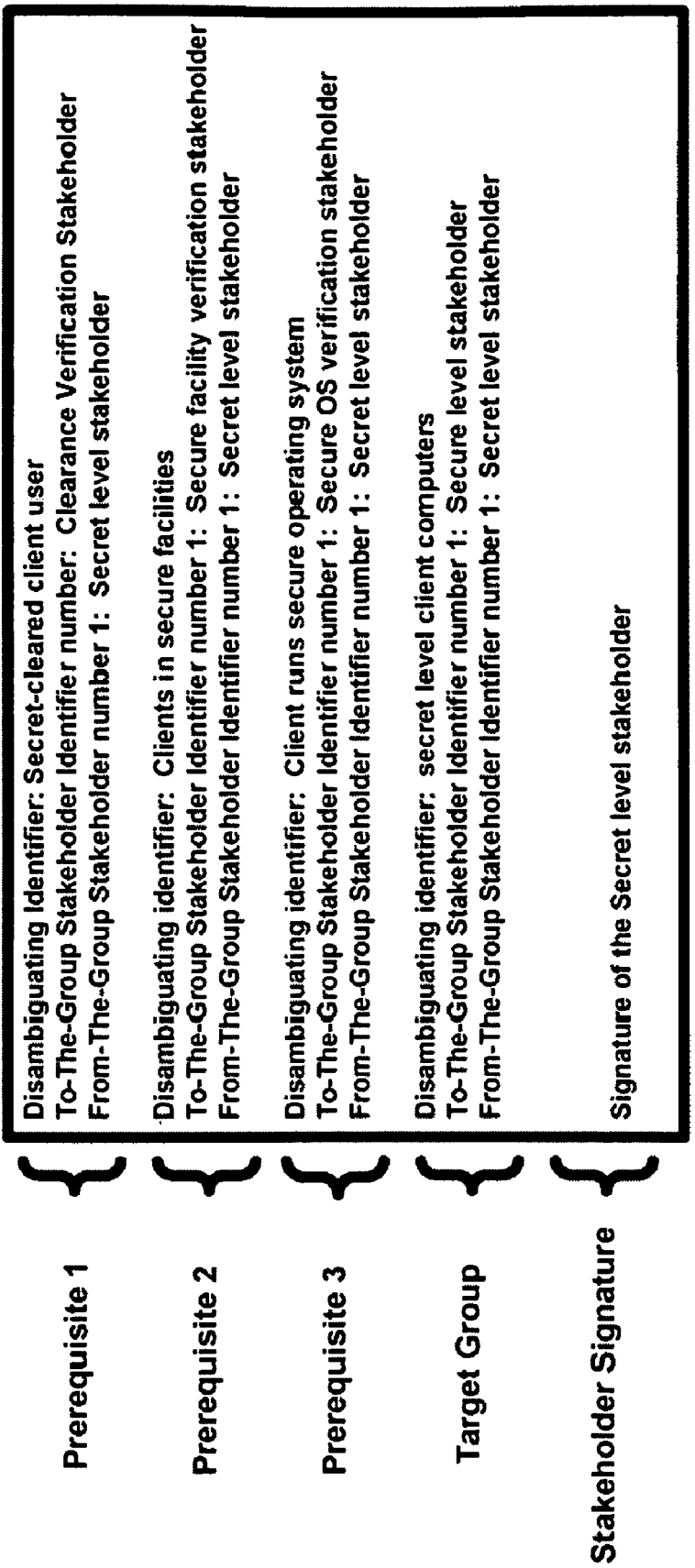
FIG. 6 shows an exemplary GMC for grouping participants.

Lastly, the secret-level stakeholder signs a GMC, shown in FIG. 6, allowing clients who are members of the three groups representing prerequisite condition verification to become a member of the secret-level client group. Because the secret-level stakeholder is the from-the-group stakeholder for these prerequisite groups and the to-the-group stakeholder for the target group, the GMC is valid and no further signatures are necessary. When someone wishes a new client computer to have access to information requiring membership in the secret-level client group, that person can communicate with the to-the-group stakeholders named by the secret-level stakeholder in the names of the prerequisite condition groups, and work with those stakeholders to convince them that the conditions have been satisfied. Once those condition verification stakeholders are convinced, they can issue GMCs listing the client computer as the prerequisite entity and the group representing the condition they verify as the target group. Because the condition verification stakeholders are the to-the-role authority listed in the group name, and no other groups are involved, the GMC require no further signatures. Thus, a new client can become a member of the secret-level client group without involving the secret-level stakeholder; only communication with that stakeholders delegated condition verification stakeholders is necessary.

Figure 7:
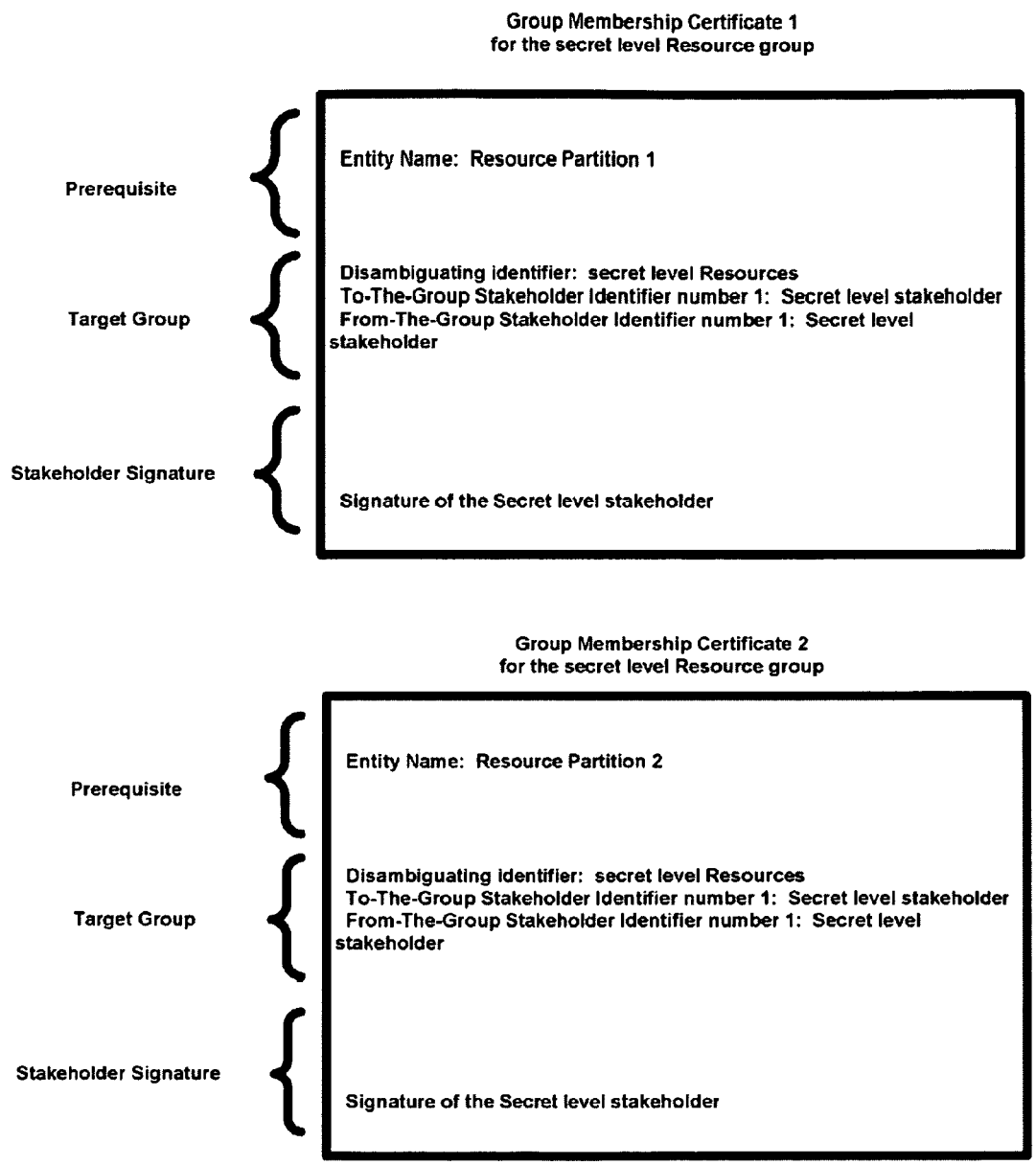
FIG. 7 shows exemplary GMCs for grouping resources.

The present invention can be used to further enhance the guard of FIG. 5 by grouping the resources the guard protects according to their security sensitivity level. For example, if two file system partitions, partition 1 and partition 2, both have secret-level sensitivity, the secret level stakeholder could create a secret-level sensitivity group containing both of those resource partitions. This group could be created using GMCs that group resources, as shown in FIG. 7. A guard having the certificates of FIG. 7 would allow privileges granted to a participant over the target group of those certificates to apply to both partition 1 and partition 2.

A further improvement to the system of FIG. 5 uses GMCs to combine privileges into groups. For example, when a single name conveys several privileges, discrete privileges could be read and write, which become the named groups read access privilege and write access privilege. An entity named "full control" could be admitted into both of these groups using the GMC of FIG. 8. When the guard possesses this GMC, it can treat the "full control" entity as possessing both read and write privileges due to their membership in the read access privilege and write access privilege groups.

According to the foregoing, in one exemplary embodiment, group names are associated, directly or indirectly, with the identity of one or more stakeholders, e.g., the public keys of those stakeholders whose approval is necessary to use membership in that group for making a decision, e.g., to allow access to a resource, perform a function, or grant membership in another group. The stakeholder could also sign the cryptographic certificate to authorize an entity in a prerequisite group to be added as a member in one or more target group. Moreover, a method for processing a cryptographic certificate receives the cryptographic certificate, which describes at least one prerequisite condition comprising membership in at least one prerequisite group of entities, and determines whether the cryptographic certificate is validly signed by at least one prerequisite group stakeholder whose approval is necessary to use membership in the prerequisite group for making a decision.

In one exemplary embodiment, each resource on the SK can be further controlled by one or more resource stakeholders who must approve access to those resources. For approval, the one or more resource stakeholders sign corresponding cryptographic authorization permits (CAPs), as fully disclosed in U.S. patent application Ser. No. 11/783,359 titled "SYSTEM AND METHOD FOR ACCESSING INFORMATION RESOURCES USING CRYPTOGRAPHIC AUTHORIZATION PERMITS" which was filed on Apr. 9, 2007 and is hereby incorporated in its entirety. Under one embodiment, CAPs are signed by one or more resource stakeholders and GMCs are signed by one or more to-the-group and from-the-group stakeholders using their respective private keys. The approval of the one or more resource stakeholders alone, however, is not sufficient for the participants to access a resource. Rather, one or more from-the-group stakeholders also independently approve prerequisite group members to accessing the resource. In this way, the concepts of GMCs and CAPs may be combined to provide privilege or access to resources based on prerequisite group membership conditions. Indeed CAPs and GMCs could be implemented on the same or different certificates.

In one exemplary embodiment the PCS mediates interactions via channels according to two security policies: the channel connectivity policy and the resource management policy. The channel connectivity policy defines the allowable connections. Essentially, this policy is an access privilege control policy that defines all access privileges. The resource management policy describes how the shared communications resources used for implementing channels are to be allocated between channels and the extent to which channels may influence each other (either cooperatively or inadvertently) through the use of shared resources.

A channel comprises a connection from a source partition to one or more destination partitions existing on the same or different nodes, including any physical or logical components, for one-way flow of inbound or outbound information.

A read access privilege allows authorized partitions to read messages from the channels and a write access privilege allows authorized partitions to write messages to the channels. Channels are used for implementing point-to-point, point-to-multipoint, or multipoint-to-multipoint communications between nodes. Each channel has an associated symmetric encryption/decryption key for the communicated messaged. The symmetric key is a shared secret key for amongst the parties used for communicating messages over the channels once channel access privilege is authorized. The shared secret key is subject to change periodically in accordance with defined security parameters.

All communication between partitions for separate nodes in the network is accomplished by communicating, i.e., reading or writing, messages over the channels. Using GMCs, one or more partitions can be grouped as participants to be granted a write access privilege, a read access privilege, or both to one or a group of channels. Also, write access privilege, read access privilege, or both can be grouped using GMCs to be applied to individual participants or channels or groups of participants or channels.

Alternatively, signed CAPs issued by one or more resource stakeholders grant partitions read, write, or read and write access privileges to the channels and signed GMCs issued by one or more to-the-group and from-the-group stakeholders group participants to access resources or groups of them if such participants satisfy specified prerequisite group membership conditions. Every channel has one or more associated resource stakeholders that are responsible for granting the necessary access privileges for reading messages from or writing messages to that channel. The identity of each channel includes the public keys of the resource stakeholders that control read and write privileges to that channel and a unique channel index under the resource stakeholder's control. Channels that are otherwise indexed identically, but have identities with different controlling resource stakeholders are considered to be different channels.

The exemplary embodiment of the system shown in FIG. 5 uses two types of partitions: a control partition and application partitions (also called user partitions). All intra-node interactions between the partitions are controlled by the control partition of the node, in conjunction with the Separation Kernel. The control partition communicates only with the Separation Kernel, other partitions on its own node, and control partitions on other nodes. Each node has at least one control partition, although in particular implementations, the partition's functions may be implemented using multiple partitions. The control partition securely stores (in a secret and non-forgeable manner) security data values, including node's private and public keys, other nodes public keys and CAPs and GMCs that implement system security. The application partitions communicate with other partitions on the same node, including the control partition, through means authorized by the local SK according to corresponding configuration data and subject to authorization permit parameter(s) of the CAPs and GMCs. The control partition provides a mechanism by which the security parameters of the SK's security policy may be changed upon receipt of a CAP or GMCs, signed by respective stakeholders.

Before communicating messages, PCS ensures that the nodes participating in the communication have consistent configuration data that authorizes that communication. For all shared resources, such as access hardware/software, cryptographic hardware/software, etc., PCS initializes and test those resources. For every channel, a sending channels endpoint (CE) partition performs mutual authentication with every receiving CE, and establishes a shared secret key. The mutual authentication, which is cryptographic, is associated with authorizing access privileges to the channels. This authentication consists of verifying the identity of the communicating subjects as well as their access privileges. Verification of subjects' identity may be performed by authenticating the identity of the containing node and/or partition by running the ECMQV protocol. A successful run of this protocol will result in a shared secret key known only to the CE's performing the authentication. Verification of the privilege to communicate over a channel requires verification of signatures contained in CAPs or GMCs that authorize some subjects to access the channel. Further verifications must be made to ensure that those signatures correspond to the stakeholders identified as responsible for protecting the channel in that channels Identity. Lastly, the CE's match the subjects named in the CAP and GMCs against the subjects whose identities were verified in the previous step. If all CE's successfully perform the preceding steps. The shared secret key is used for encryption and decryption of messages communicated over the channels.

Once initialization of the shared resources and channels is completed, the CPs are notified that the channels are ready for communication of messages. Access to the channels requires independent permits by one or more stakeholders that are responsible for issuing CAPS or GMCs in accordance with a promulgated SP. Access to channels via CAPs and/or GMCs may require independent authorizations by multiple authorities. As stated above, the present invention uses policies that are signed by authorities for implementing security parameters. In an exemplary embodiment, a signed policy comprises a list of CAPs and GMCs and a list of the public keys of corresponding stakeholders. The policy is signed by one or more of the stakeholders that are responsible for the protection of the channels and by one or more stakeholders that are responsible for controlling group memberships. The combination of GMCs and CAPs provide for a highly scalable implementation of security policies in any information system; GMCs allow participants to be grouped into equivalence classes which CAPs can use as prerequisites in lieu of participant identities, thereby avoiding repetition. Furthermore, the transitive binding via GMCs provides further scalability by allowing groups to be defined in terms of conjunctive and disjunctive combinations of other groups. This contrasts with other schemes where roles (or attributes) must be bound directly to participants.

From the foregoing, it would be appreciated that the authorizations for grouping of entities are based on public keys issued by one or more stakeholders, and each GMC comprises a cryptographic certificate digitally signed by such stakeholders. Grouping of entities require cryptographic signature of one or more stakeholders that control the prerequisite conditions for authorizing such grouping of entities.

The present invention enforces security policies with no pre-set limits on the number of system nodes. The present invention does not require any limits on the number of security domains recognized or the information-flow policies enforced on these domains. Consequently, the security policies of the system can be changed dynamically as the need arises, without changing the deployed software. Moreover, systems created by the present invention do not depend on access to third parties (including authorities or stakeholders) to perform a verification. Verifications can be performed by any entity possessing a GMC and the public keys of the stakeholders. Such systems continue to function with little or no degradation in performance or security when any node is lost or malfunctions. The present invention can be used for military applications, classification levels, need-to-know restrictions, banking, clearing centers using separate partitions for separate accounts.

We claim:

1. A method for issuing a digital cryptographic certificate, comprising:
    digitally describing on the cryptographic certificate:
        at least one prerequisite condition, wherein the at least one prerequisite condition comprises membership in at least one prerequisite group of entities; and
        at least one prerequisite to-the-group stakeholder which permits membership in the at least one prerequisite group of entities; and
    digitally signing, using one or more hardware computing elements, the cryptographic certificate by at least one prerequisite from-the-group stakeholder which approves use of the membership in the at least one prerequisite group permitted by the at least one prerequisite to-the-group stakeholder for making a decision,
    wherein the digitally signing authorizes the use of the membership as a condition for making the decision.

2. The method of claim 1, wherein the decision relates to at least one of admitting an entity for membership in another group, granting access to a resource, granting a privilege or performing an action.

3. The method of claim 1, wherein a name of the at least one prerequisite group is associated with the identity of the prerequisite from-the-group stakeholder.

4. The method of claim 3, wherein the identity of the at least one prerequisite from-the-group stakeholder comprises a public key of such stakeholder.

5. The method of claim 1, wherein the cryptographic certificate is further signed by one more resource stakeholders that control access to a privilege or resource.

6. The method claims 1, wherein the one or more prerequisite from-the-group stakeholders authorize an entity in the at least one prerequisite group to be an entity in at least one target group, and wherein the cryptographic certificate is further signed by at least one target group stakeholder that authorizes the entity to be added as a member to the at least one target group.

7. The method of claim 6, wherein a the name of the at least one target group comprises:
    a name of at least one target group stakeholder that authorizes membership of the entity member of said at least one target group in another group; and
    a name of the at least one target group stakeholder that authorizes the entity to become the member of said at least one target group.

8. The method of claim 7, wherein the name of the at least one target group further comprises at least one target group disambiguating identifier.

9. The method of claim 7, wherein the names of said at least one target group stakeholders comprises public keys of the at least one target group stakeholders and signatures of the at least one target group stakeholders comprise cryptographic signatures of the cryptographic certificate made using said at least one target group stakeholders' private keys.

10. The method of claim 1, wherein the at least one prerequisite condition relates to at least one of a membership in another group of entities, a physical characteristic, a nonphysical characteristic, a temporal characteristic, a non-temporal characteristic, a location characteristic or a position characteristic.

11. The method of claim 1, wherein a name of the at least one prerequisite group comprises:
    a name of at least one prerequisite from-the-group stakeholder that authorizes an entity in the at least one prerequisite group to be a member of another group of entities; and
    a name of at least one prerequisite to-the-group stakeholder that authorizes membership of the entity in the at least one prerequisite group.

12. The method of claim 11, wherein the name of the at least one prerequisite group further comprises at least one prerequisite group disambiguating identifier.

13. The method of claim 11, wherein the names of the at least one prerequisite from-the-group stakeholders comprise public keys of said at least one prerequisite from-the-group stakeholders and signatures of said at least one prerequisite from-the-group stakeholders comprise cryptographic signatures of the cryptographic certificate made using such stakeholders' private keys.

14. The method of claim 1, wherein an entity comprises at least one of a participant, resource or privilege.

15. A method for processing a digital cryptographic certificate, comprising:
    receiving the cryptographic certificate, said cryptographic certificate describing:
        at least one prerequisite condition comprising membership in at least one prerequisite group of entities; and
        at least one prerequisite to-the-group stakeholder which permits membership in the at least one prerequisite group of entities; and
    determining, using one or more hardware computing elements, whether the cryptographic certificate is validly digitally signed by at least one prerequisite from-the-group stakeholder which approves use of membership in the prerequisite group permitted by the at least one prerequisite to-the-group stakeholder in making a decision,
    wherein valid digital signatures of the certificate by the at least one prerequisite from-the-group stakeholder authorize the use of membership as a condition for making the decision.

16. The method of claim 15, wherein the decision relates to at least one of admitting an entity for membership in another group, granting access to a resource, granting a privilege, or performing an action.

17. The method of claims 15, wherein the one or more prerequisite from-the-group stakeholders authorize an entity in an at least one prerequisite group to be an entity in at least one target group and wherein the method further comprises determining whether the cryptographic certificate is validly signed by at least one target group stakeholder that authorizes the entity to be added as a member to the at least one target group.

18. The method of claim 17, wherein a name of the at least one target group comprises:
    a name of at least one target group stakeholder that authorizes membership of an entity member of the at least one target group in another group; and
    a name of the at least one target group stakeholder that authorizes the entity to become the member of the at least one target group.

19. The method of claim 18, wherein the name of the at least one target group further comprises at least one target group disambiguating identifier.

20. The method of claim 18, wherein the names of the at least one target group stakeholders comprise public keys of said at least one target group stakeholders and signatures of said at least one target group stakeholders comprise cryptographic signatures of the certificate made using said at least one target group stakeholders' private keys.

21. The method of claim 15, wherein a name of the at least one prerequisite group is associated with the identity of the at least one prerequisite from-the-group stakeholder.

22. The method of claim 21, wherein the identity of the at least one prerequisite from-the-group stakeholder comprises a public key of such stakeholder.

23. The method of claim 15, further comprises determining whether the cryptographic certificate is validly signed by at least one resource stakeholder who controls access to a privilege or resource.

24. The method of claim 15, wherein the prerequisite condition relates to at least one of a membership in another group of entities, a physical characteristic, a non-physical characteristic, a temporal characteristic, a non-temporal characteristic, a location characteristic or a position characteristic.

25. The method of claim 15, wherein a name of the at least one prerequisite group comprises:
  a name of at least one prerequisite from-the-group stakeholder that authorizes an entity in the at least one prerequisite group to be a member of another group of entities; and
  a name of at least one prerequisite to-the-group stakeholder that authorizes membership of the entity in the at least one prerequisite group.

26. The method of claim 25, wherein the name of the at least one prerequisite group further comprises at least one prerequisite group disambiguating identifier.

27. The method of claim 25, wherein the names of the at least one prerequisite from-the-group stakeholders comprise public keys of said at least one prerequisite from-the-group stakeholders and signatures of the at least one prerequisite from-the-group stakeholders comprise cryptographic signatures of the cryptographic certificate made using such stakeholders' private keys.

28. The method of claim 15, wherein an entity comprises at least one of a participant, a resource or a privilege.

29. A digital cryptographic certificate stored on one or more tangible non-transitory computer-readable storage media, comprising:
  names of one or more of prerequisite groups;
  one or more prerequisite to-the-group stakeholders which permit membership in the one or more prerequisite groups; and
  one or more digital cryptographic signatures of one or more prerequisite from-the-group stakeholders which approve use of membership in the prerequisite group permitted by the one or more prerequisite to-the-group stakeholders for making a decision,
  wherein the one or more digital cryptographic signatures authorize the use of membership in the one or more prerequisite groups as a condition for making the decision.

30. The cryptographic certificate of claim 29, wherein the one or more prerequisite from-the-group stakeholders authorize an entity in the one or more prerequisite groups to be an entity in one or more target groups.

31. The cryptographic certificate of claim 30 further comprising the names of one or more target groups.

32. The cryptographic certificate of claim 31, wherein the names of the target groups comprise:
  names of one or more target group stakeholders that authorize membership of an entity member of the one or more target groups in another group; and
  names of one or more target group stakeholders that authorize the entity to become the member of the one or more target groups.

33. The cryptographic certificate of claim 32, wherein the names of the one or more target groups further comprise at least one target group disambiguating identifier.

34. The cryptographic certificate of claim 32, wherein the names of the target group stakeholders comprise public keys of the one or more target group stakeholders and signatures of the one or more target group stakeholders comprise cryptographic signatures of the cryptographic certificate made using the one or more target group stakeholders' private keys.

35. The cryptographic certificate of claim 30 further comprising names of the one or more target groups and cryptographic signatures of one or more target group stakeholders that authorize adding the entity to the one or more target groups.

36. The cryptographic certificate of claim 29, wherein the decision relates to at least one of admitting an entity for membership in another group, granting access to a resource, granting a privilege or performing an action.

37. The cryptographic certificate of claim 29, wherein the names of the one or more prerequisite groups are associated with the identity of the one or more prerequisite from-the-group stakeholders.

38. The cryptographic certificate of claim 37, wherein the identity of a prerequisite from-the-group stakeholder comprises a public key of such stakeholder.

39. The cryptographic certificate of claim 29, further comprising cryptographic signatures of one more resource stakeholders who control access to a privilege or a resource.

40. The cryptographic certificate of claim 29, wherein the prerequisite condition relates to at least one of a membership in another group of entities, a physical characteristic, a non-physical characteristic, a temporal characteristic, a non-temporal characteristic, a location characteristic or a position characteristic.

41. The cryptographic certificate of claim 29, wherein the names of one or more prerequisite groups comprise:
  names of one or more prerequisite from-the-group stakeholders that authorize an entity in the one or more prerequisite groups to be a member of at least one target group of entities; and
  names of one or more prerequisite to-the-group stakeholders that authorize membership of the entity in the one or more prerequisite groups.

42. The cryptographic certificate of claim 41, wherein the name of the prerequisite group further comprises at least one prerequisite group disambiguating identifier.

43. The cryptographic certificate of claim 41, wherein the names of the one or more prerequisite from-the-group stakeholders comprise public keys of the one or more prerequisite from-the-group stakeholders and the one or more signatures of the one or more prerequisite from-the-group stakeholders comprise cryptographic signatures of the cryptographic certificate made using such stakeholders' private keys.

44. The cryptographic certificate of claim 29, wherein an entity comprises at least one of a participant, a resource or a privilege.

45. A system that processes digital cryptographic certificates, comprising:
  a plurality of entities;
  one or more digital group membership certificates stored on one or more tangible non-transitory computer-readable storage media, each group membership certificate containing names of one or more prerequisite groups and names of one or more target groups;
  one or more stakeholders functioning as one or more prerequisite from-the-group stakeholders, prerequisite to-the-group stakeholders, and target group stakeholders, a group membership certificate being valid if digitally signed cryptographically by those one or more prerequisite from-the-group stakeholders that authorize an entity name in the one or more prerequisite groups to become an entity name in another group, wherein the group membership certificate describes one or more prerequisite to-the-group stakeholders that permit membership in the one or more prerequisite group, wherein one or more signatures of the certificate by the one or more prerequisite from-the-group stakeholders authorize the use of membership in the one or more prerequisite groups permitted by the one or more prerequisite to-the-group stakeholders as a condition for a decision to add the entity name in the another group, said group membership certificate being further digitally signed cryptographically by those one or more target group stakeholders that authorize adding the entity name to the one or more target groups; and a node that receives a digital cryptographic certificate from the entity; said node examining the one or more group membership certificates and adding a corresponding entity name to the target group named in said one or more group membership certificates provided that the received cryptographic certificate validly binds a corresponding entity to a prerequisite group contained in the valid group membership certificate.

\* \* \* \* \*